(12) United States Patent
Park et al.

(10) Patent No.: US 11,173,463 B2
(45) Date of Patent: Nov. 16, 2021

(54) FLUIDIZED BED REACTOR

(71) Applicant: LG CHEM, LTD., Seoul (KR)

(72) Inventors: Hyun Woo Park, Daejeon (KR); Se Hyun Kim, Daejeon (KR); Kwang Woo Yoon, Daejeon (KR); Og Sin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 17/053,944

(22) PCT Filed: Jan. 20, 2020

(86) PCT No.: PCT/KR2020/000929
§ 371 (c)(1),
(2) Date: Nov. 9, 2020

(87) PCT Pub. No.: WO2020/175800
PCT Pub. Date: Sep. 3, 2020

(65) Prior Publication Data
US 2021/0220790 A1 Jul. 22, 2021

(30) Foreign Application Priority Data
Feb. 28, 2019 (KR) .................. 10-2019-0024231

(51) Int. Cl.
B01J 8/44 (2006.01)
B01J 8/18 (2006.01)
B01J 8/00 (2006.01)
B01J 8/40 (2006.01)

(52) U.S. Cl.
CPC .................. *B01J 8/44* (2013.01); *B01J 8/004* (2013.01); *B01J 8/1809* (2013.01); *B01J 8/40* (2013.01); *B01J 2208/00044* (2013.01); *B01J 2208/00548* (2013.01); *B01J 2208/00884* (2013.01); *B01J 2208/00902* (2013.01)

(58) Field of Classification Search
CPC ......... B01J 8/44; B01J 8/24; B01J 8/40; B01J 8/1809; B01J 2208/00548; B01J 2208/00044; B01J 2208/00902; B01J 2208/000884
See application file for complete search history.

(56) References Cited

U.S. PATENT DOCUMENTS

| 6,076,810 A | 6/2000 | Chang et al. |
| 6,199,835 B1 | 3/2001 | Chang et al. |
| 8,875,728 B2 | 11/2014 | Sansegundo-Sanchez et al. |

(Continued)

FOREIGN PATENT DOCUMENTS

| JP | 11217571 A | 8/1999 |
| JP | 2006045051 A | 2/2006 |

(Continued)

*Primary Examiner* — Lessanework Seifu
(74) *Attorney, Agent, or Firm* — Dentons US LLP

(57) ABSTRACT

A fluidized bed reactor includes: a reactor body; a dispersion plate mounted within the reactor body to partition the inside of the reactor body in a traverse direction and having a plurality of holes through which a reaction gas passes; a nozzle unit mounted on one surface of the dispersion plate to receive an inert gas from outside the reactor and inject the inert gas so as to crush deposits on the dispersion plate; a sensing unit configured to sense the deposits on the dispersion plate; and a control unit configured to control operation of the nozzle unit according to information sensed in the sensing unit.

10 Claims, 9 Drawing Sheets

(56) References Cited

U.S. PATENT DOCUMENTS

| | | |
|---|---|---|
| 2011/0142726 A1 | 6/2011 | Sugiyama et al. |
| 2014/0086820 A1 | 3/2014 | Nakamura et al. |
| 2014/0127116 A1 | 5/2014 | Filtvedt et al. |
| 2015/0158001 A1 | 6/2015 | Nakamura et al. |
| 2016/0067665 A1 | 3/2016 | Jiang et al. |
| 2016/0101982 A1 | 4/2016 | Pedron et al. |
| 2016/0236940 A1 | 8/2016 | Weckesser et al. |
| 2020/0072460 A1 | 3/2020 | Klajny et al. |

FOREIGN PATENT DOCUMENTS

| | | |
|---|---|---|
| JP | 2012236727 A | 12/2012 |
| KR | 10-19980064781 A | 10/1998 |
| KR | 10-0536391 B1 | 12/2005 |
| KR | 10-0784148 B1 | 12/2007 |
| KR | 10-20090013503 A | 2/2009 |
| KR | 10-20090073346 A | 7/2009 |
| KR | 10-0926447 B1 | 11/2009 |
| KR | 10-0948086 B1 | 3/2010 |
| KR | 10-0964867 B1 | 6/2010 |
| KR | 10-20100073149 A | 7/2010 |
| KR | 10-20120098834 A | 9/2012 |
| KR | 10-1239168 B1 | 3/2013 |
| KR | 10-20140047614 A | 4/2014 |
| KR | 10-1401472 B1 | 5/2014 |
| KR | 10-20140110298 A | 9/2014 |
| KR | 10-20140124457 A | 10/2014 |
| KR | 10-1545384 B1 | 8/2015 |
| KR | 10-20150120613 A | 10/2015 |
| KR | 10-20160036305 A | 4/2016 |
| KR | 10-20160057254 A | 5/2016 |
| KR | 10-1771290 B1 | 8/2017 |
| KR | 10-1773653 B1 | 8/2017 |
| KR | 10-1783512 B1 | 9/2017 |
| KR | 10-1784043 B1 | 10/2017 |
| KR | 10-1800309 B1 | 11/2017 |
| KR | 10-1818685 B1 | 1/2018 |
| KR | 10-1851543 B1 | 4/2018 |
| KR | 10-1881197 B1 | 7/2018 |
| WO | 2018-196997 A1 | 11/2018 |

(a) (b)

FLUIDIZED BED REACTOR

The present application is a National Phase entry pursuant to 35 U.S.C. § 371 of International Application No. PCT/KR2020/000929 filed on Jan. 20, 2020, and claims priority to and the benefit of Korean Patent Application No. 10-2019-0024231, filed on Feb. 28, 2019, which are hereby incorporated by reference in their entirety.

FIELD

The present invention relates to a fluidized bed reactor for manufacturing a carbon nanotube, and more particularly, to a fluidized bed reactor in which a sensing unit is provided to grasp a state of a deposit deposited on a dispersion plate, and a nozzle unit is provided on the dispersion plate to crush the deposit by injecting an inert gas.

BACKGROUND

Carbon nanotubes (CNTs) are materials in which three carbon atoms adjacent to each other are bonded to each other in a hexagonal honeycomb structure to a carbon plane, and the carbon plane is rolled in a cylindrical shape to form a tube. Carbon nanotubes are spotlighted as new materials that are widely applied in various technical fields. For example, the carbon nanotubes are applied to an electrode of an electrochemical storage device such as an electromagnetic shielding device, a display device, or a gas sensor as well as a secondary batter, a full-cell, and the like.

As methods of manufacturing carbon nanotubes, an arc discharge method, a laser evaporation method, a chemical vapor deposition method, and the like have been disclosed.

Among them, in the chemical vapor growth method, generally, metallic catalyst particles and a hydrocarbon-based reaction gas react with each other in a fluidized bed reactor having a high temperature to generate carbon nanotubes.

Referring to FIG. 1A, in which a left side illustrates an external appearance of a reactor body 1, and a right side (when viewed downward from an upper side at a certain distance) illustrates a state, in which a dispersion plate 2 is mounted, by seeing through the inside of the reactor body 1, as a schematic configuration of a fluidized bed reactor according to the related art, the fluidized bed reactor comprises the reactor body 1 having an empty cylindrical pipe shape in a longitudinal direction and has a structure in which an inlet 1a of the reactor body 1 has a tapered shape, and a reaction gas injected into the inlet 1a is discharged to an outlet 1b via punched holes 2a that are punched in the dispersion plate 2.

The reactor body 1 may be selectively coupled to a heater (not shown) so as to be heated at a high temperature. While the reaction gas flows, a catalyst metal provided in the reactor body 1 is synthesized with the reactor body 1 to manufacture CNT.

Here, the dispersion plate 2 uniformly disperses the reaction gas within the reactor body 1 and allows the reaction gas to pass therethrough, thereby preventing catalyst metal and powder generated by the reaction from falling down.

That is, in the fluidized bed reactor, when the metal catalyst is placed on the dispersion plate 2, and the reaction gas is supplied upward from a lower side through the punched holes 2a, the metal catalyst reacts while flowing above the dispersion plate 2.

However, as illustrated in FIG. 1B which illustrates the inside of the reactor body 1 during the synthesis of the CNT, secondary particles grown from catalyst metal particles during the synthesis of the CNT are aggregated with each other to form a lump and then generate a deposit that becomes harder as a time elapses.

The generation of the deposit causes various problems in the reactor body 1. For example, in a region in which the deposits are formed in FIG. 1B, the deposits close the punched holes 2a of the dispersion plate 2 to interrupt the flow of the reaction gas, thereby adversely affecting the synthesis of the CNT. The deposits are aggregated with each other in the reactor body 1 to cause defects and also malfunction of various sensor and devices.

In order to solve these problems, according to the related art, a vibrator is installed inside or outside the reactor body 1 to apply vibration, or an impeller that rotates within the reactor body 1 to crush the deposits.

However, the synthesis of the CNT is carried out at a high temperature of 600 degrees to 1,000 degrees. In addition, since a flammable gas such as ethylene, methane, and the like is used as the reaction gas, physical impacts due to the vibration of the vibrator and the rotation of the impeller may act as risk factors that accompany a fire risk. Also, in the method according to the related art, it is difficult to completely crush the deposits.

SUMMARY

Accordingly, a main object of the present invention is to provide a fluidized bed reactor that is capable of sealing generation of deposits occurring on a dispersion plate and efficiently crushing and removing the generated deposits.

A fluidized bed reactor for manufacturing carbon nanotubes according to the present invention for achieving the above object comprises: a longitudinally-extending reactor body; a dispersion plate mounted within the reactor body to partition the inside of the reactor body in a traverse direction and having a plurality of holes through which a reaction gas passes; a nozzle unit mounted on one surface of the dispersion plate to receive an inert gas from outside the reactor body and inject the inert gas so as to crush deposits on the dispersion plate; a sensing unit configured to sense the deposits on the dispersion plate; and a control unit configured to control operation of the nozzle unit according to information sensed by the sensing unit.

A plurality of nozzle units may be provided, which are spaced apart from each other along a circumference of the dispersion plate.

The nozzle unit according to the present invention may comprise: a housing fixed to one surface of the dispersion plate on which the deposits are accumulated; a supply line configured to supply the inert gas from the outside into the housing; and an injection part provided in the housing to inject the inert gas.

Two or more injection parts may be provided in the housing to inject the inert gas in different directions. Also, at least one of the injection parts provided in the housing may be disposed to inject the inert gas toward the housing adjacent thereto.

The sensing unit may comprise a thermometer spaced a predetermined distance from the one surface of the dispersion plate on which the deposits are accumulated, and the control unit may estimate an accumulated amount of deposits according to a temperature change.

A plurality of thermometers may be provided, which are spaced apart from each other along a circumference of the dispersion plate. Preferably, a plurality of thermometers are provided and disposed at different distances from the dispersion plate.

The thermometer may be a contact type thermometer configured to measure a temperature by directly contacting the deposits or may be a non-contact type thermometer that is disposed at a position that does not contact the deposits to measure a temperature by sensing light energy emitted from the deposits. However, since the inside of the reactor body has a high temperature, it is preferable to use the contact type thermometer according to the possibility of failures, measurement reliability, and durability.

According to the present invention having the technical features as described above, the deposits within the reactor body may be sensed through the sensing unit and be crushed through the nozzle unit to improve the production efficiency of the carbon nanotubes.

Since the plurality of nozzle units are spaced apart from each other along the circumference of the dispersion plate, a shading section to which the inert gas does not reached may be minimized or suppressed to more efficiently crush the deposits.

Also, the nozzle unit may be provided with two or more injection parts in each of the housings to inject the inert gas in move various directions.

Furthermore, the plurality of thermometers constituting the sensing unit may be may be mounted to efficiently sense the generation state of the deposits according to the temperature difference of each point.

DETAILED DESCRIPTION

Figure 1A:
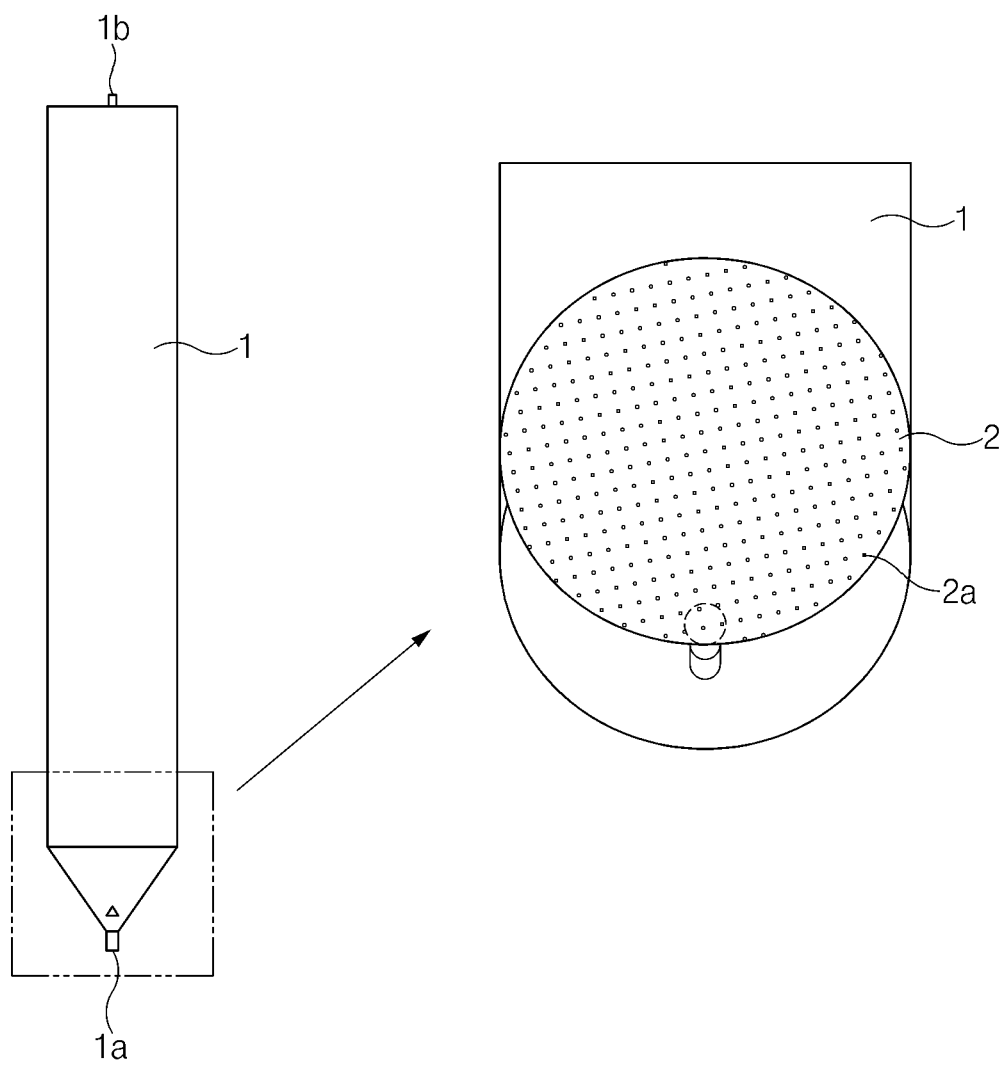
FIG. 1A is a schematic view illustrating a configuration of a fluidized bed reactor according to a related art, wherein a left side illustrates an external appearance of a reactor body, and a right side illustrates a state, in which a dispersion plate is mounted, by seeing through the inside of the reactor body.
Figure 1B:
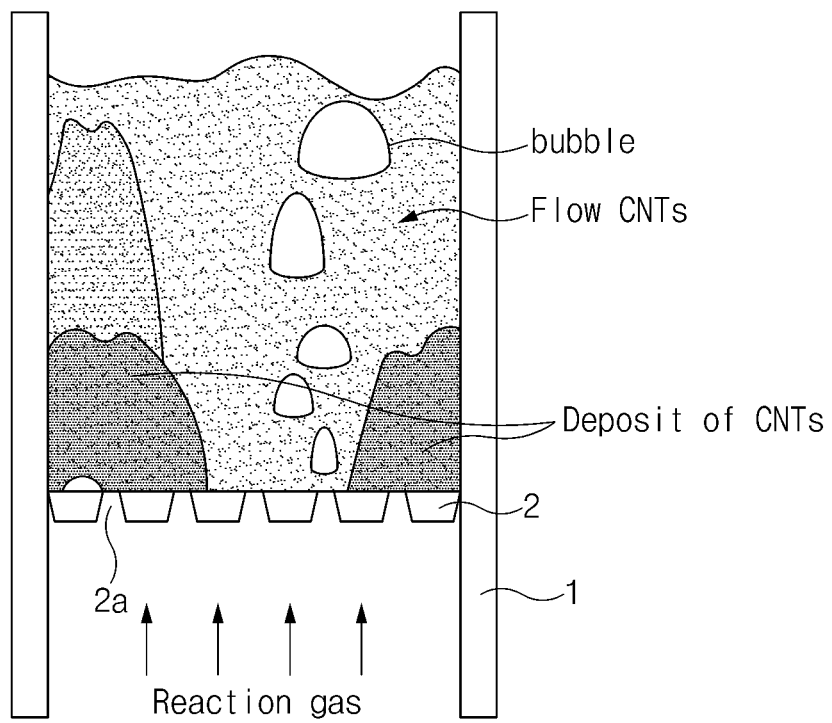
FIG. 1B is a cross-sectional view illustrating the inside of the reactor body of FIG. 1a during synthesis of a CNT.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a fluidized bed reactor for manufacturing a carbon nanotube. Hereinafter, the present invention will be described in more detail with reference to the accompanying drawings.

Figure 2:
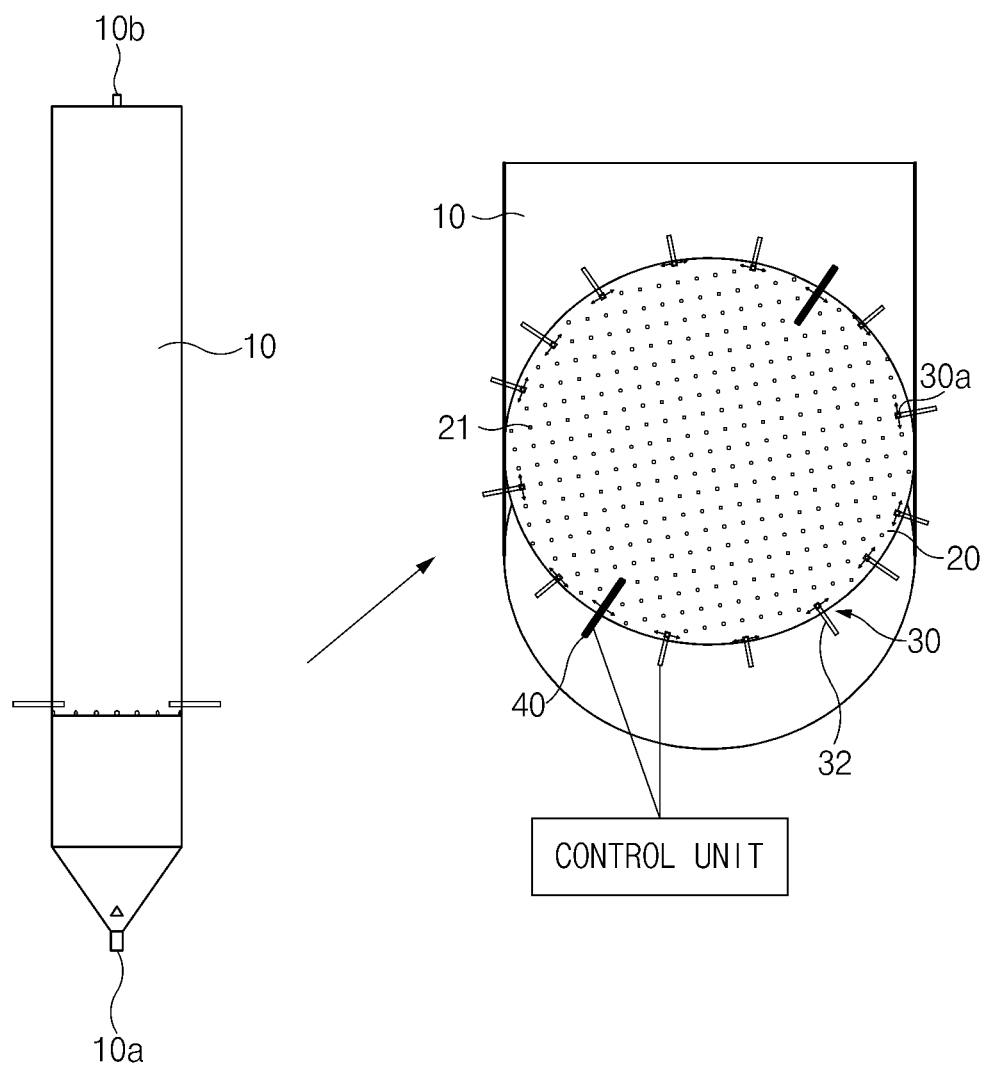
FIG. 2 is a schematic view illustrating an internal configuration of a fluidized bed reactor according to an embodiment of the present invention, wherein a left side illustrates an external appearance of a reactor body, and a right side illustrates a state, in which a dispersion plate comprising a thermometer and a nozzle unit is mounted, by seeing through the inside of the reactor body.
Figure 3A:
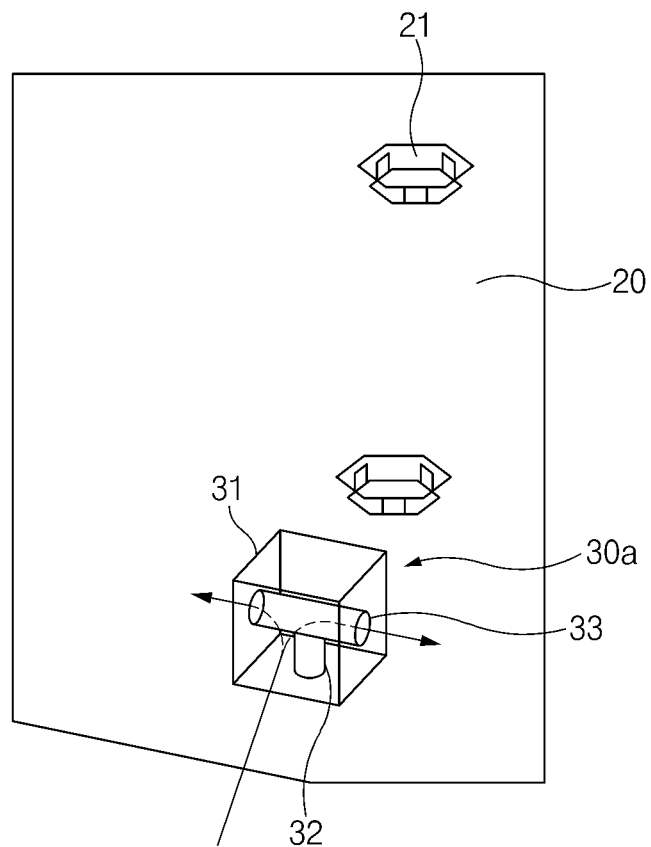
FIG. 3A is an enlarged view of a portion of the dispersion plate, at which the nozzle unit is mounted, by seeing through the nozzle unit.
Figure 3B:
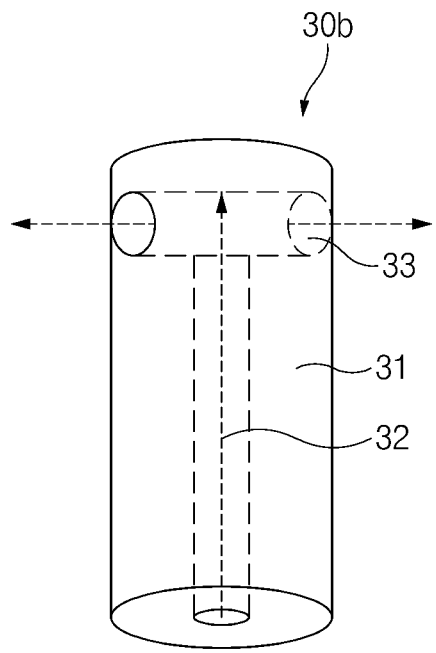
FIG. 3B is a perspective view of a nozzle unit having a different deformed shape.

Referring to FIG. 2, which illustrates an internal configuration of a fluidized bed reactor according to an embodiment of the present invention, wherein a left side illustrates an external appearance of a reactor body, and a right side illustrates a state, in which a dispersion plate comprising a thermometer and a nozzle unit is mounted, by seeing through the reactor body, and FIGS. 3A and 3B, which illustrate a fluidized bed reactor having a structure in which a dispersion plate 20 having a circular shape is mounted in a reactor body 10 having an empty cylindrical pipe shape in a longitudinal direction according to exemplary embodiments of the present invention.

The dispersion plate 20 is mounted to partition the inside of the reactor body 10 in a traverse direction, and a plurality of holes 21 are uniformly distributed in the dispersion plate 20 so that the reaction gas flowing from the inlet 10a to the outlet 10b of the reactor body 10 passes through the dispersion plate 20.

Also, a nozzle unit and a sensing unit are mounted on one surface (a surface on which a deposit is formed) on which carbon nanotubes are synthesized, and the nozzle unit 30 and the sensing unit are electrically or wirelessly connected to a control unit to communicate with the control unit. The control unit is connected to external devices comprising a supply device that supplies an inert gas to the nozzle unit 30 to control an operation of the nozzle unit 30 on the basis of information provided from the sensing unit. The control unit may be combined with software or hardware that controls the fluidized bed reactor or may be additionally provided as a separate device.

The nozzle unit 30 is configured to receive the inert gas (for example, nitrogen) supplied from the outside and spray the inert gas to the deposits deposited on the dispersion plate 20 under appropriate pressure conditions, thereby crushing the deposits.

The nozzle unit 30 (30a and 30b) comprises a housing 31 fixed to one surface of the dispersion plate 20 on which the deposits are accumulated. The housing 31 may have a cylindrical or prismatic shape as illustrated in FIGS. 3A and 3B, but is not limited in size and shape within a range that does not cause an interference in flow and synthesis of the catalytic metal and the reaction gas, and may be disposed to be fixed to the dispersion plate 20. For reference, the cylindrical housing 31 illustrated in FIG. 3B may generate less flow resistance in comparison to the prismatic housing 31a illustrated in FIG. 3A when the gas and the catalyst metal flow. The size and shape housing 31 may be determined in various forms such as a polyhedral shape, a cylindrical shape, and a conical shape according to an arranged structure of the thermometer 40 to be described below and an internal design of the reactor body 10.

The housing 31 is connected to the outside of the reactor body 10 so that an end of a supply line 32 that supplies the inert gas from an external inert gas storage device (not shown) is connected thereto. The supply line 32 may supply the inert gas supplied at an appropriate pressure from the external storage device to the housing 31. As illustrated in FIG. 2, one supply line 32 may be connected to one housing 31, or one supply line 32 may be connected to the plurality of housings 31.

Since a cross-sectional area of injection of the inert gas within the housing 31 is reduced at the end of the supply line 32, an injection part 33 is mounted or formed on the housing 31 so that the inert gas is injected while pressure energy is converted into velocity energy. The injection part 33 has a structure in which an area of a flow path through which the inert gas flows is less than that of the supply line 32 and thus injects the inert gas at a sufficient pressure and velocity at which the deposits are capable of being crushed.

As illustrated in FIGS. 3A and 3B, although one injection part 33 is provided in one housing 31 in the present invention, it is preferable that two injection parts 33 are provided in one housing 31 to inject the inert gas in different directions (here, several injection parts exceeding the two injection parts may be provided to inject the inert gas in several directions. In this case, a sufficiently high pressure has to be applied when the inert gas is supplied).

Figure 5:
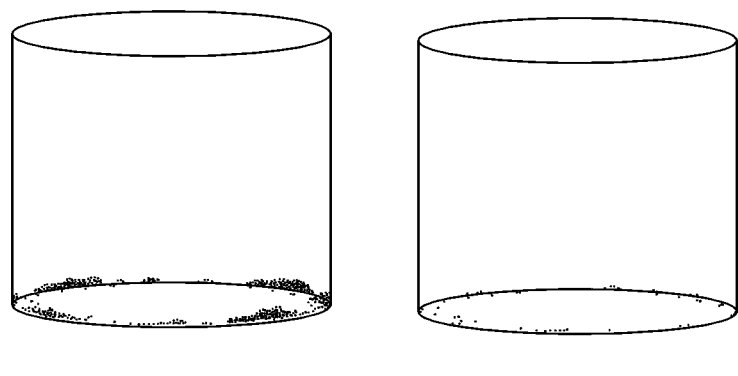
FIG. 5 is a schematic view illustrating a state a in which deposits are accumulated in a fluidized bed reactor according to the related art and a state b in which deposits are crushed in a fluidized bed reactor according to the present invention.

Also, as illustrated in FIG. 2, a plurality of nozzle units 30 are regularly arranged at regular intervals along a circumference in the vicinity of an edge of the circular dispersion plate 20. In addition, at least one of the injection parts 33 provided in the housing 31 is disposed to inject the inert gas along the circumference of the dispersion plate 20 toward the adjacent housing 31. As illustrated in FIG. 5 which illustrates a state (a) in which the deposits are accumulated in the fluidized bed reactor according to the related art is simplified, and a state (b) in which the deposits are crushed in the fluidized bed reactor according to the present invention is simplified, this is done for more efficiently crushing the deposits that are more accumulated on the edge portion at which the dispersion plate 20 and the reactor body 10 contact each other.

Also, the sensing unit that senses the deposited state of the deposits deposited on the dispersion plate 20 is provided as a thermometer 40.

The thermometer 40 may be a non-contact type thermometer for measuring a temperature by sensing light energy emitted from the deposits. However, in the case of the non-contact type thermometer, since the inside of the reactor body 10 has a high temperature of 600 degrees or more, it is preferable that a contact type thermometer that measures a temperature by directly contacting the deposits is used in consideration of the possibility of failures and reliability.

The plurality of thermometers 40, like the nozzle unit 30, may be spaced apart from each other along the circumference of the dispersion plate 20 to transmit temperature information to the control unit. The control unit may predict and detect the generation of the deposit according to a temperature deviation measured in the thermometer 40 during the reaction process.

That is, when deposits are generated at a specific portion, the reaction gas may do not pass through the specific portion, and thus, the synthesis may not be properly performed. As a result, the thermometer that is closest to the specific portion may measure a lower temperature than other thermometers, and thus, the control unit may estimate a position and amount of generation of the deposits to control an operation of the nozzle unit 30, thereby crushing the deposits.

Furthermore, the thermometer 40 according to the present invention has a rod or ring shape, and a portion of the thermometer 40 is located inside the reactor body 10 to measure an internal temperature in real time, and a portion of the thermometer 40 is located outside the reactor body 10 to transmit/receive data to/from the control unit.

The present invention provides three embodiments according to the arrangement of the thermometer 40.

Figure 4A:
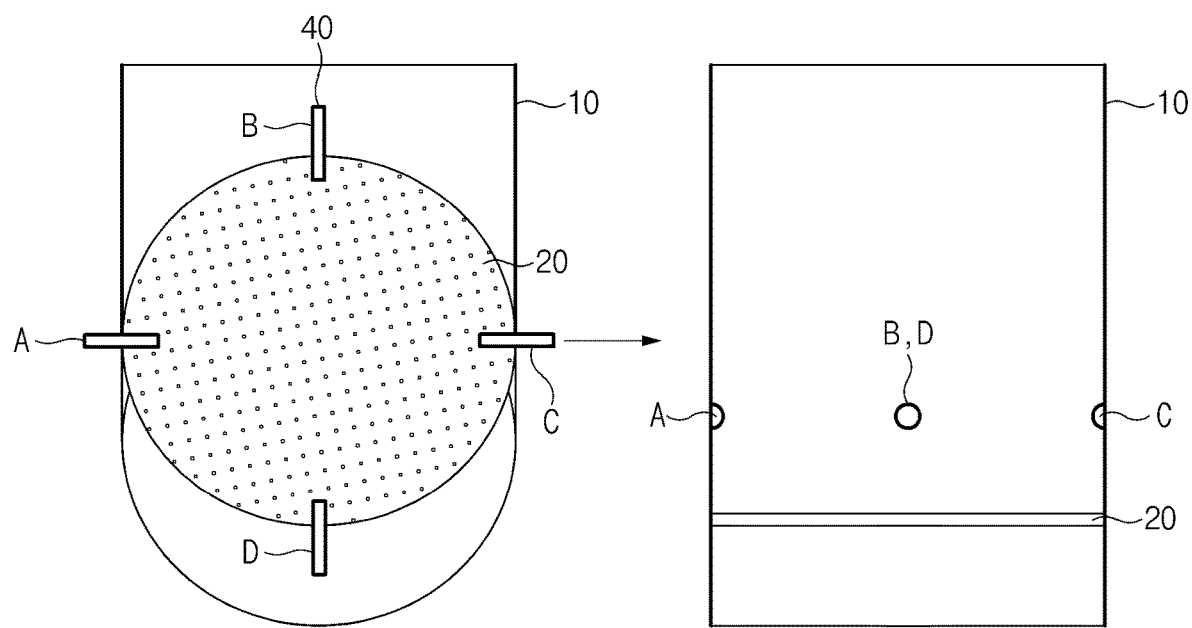
FIG. 4A is a view illustrating a state (left: a perspective view from an upper side to a lower side, and right: a front view from the outside) in which thermometers are disposed at four points of the reactor body at the same height according to Embodiment 1 of the present invention.
Figure 4B:
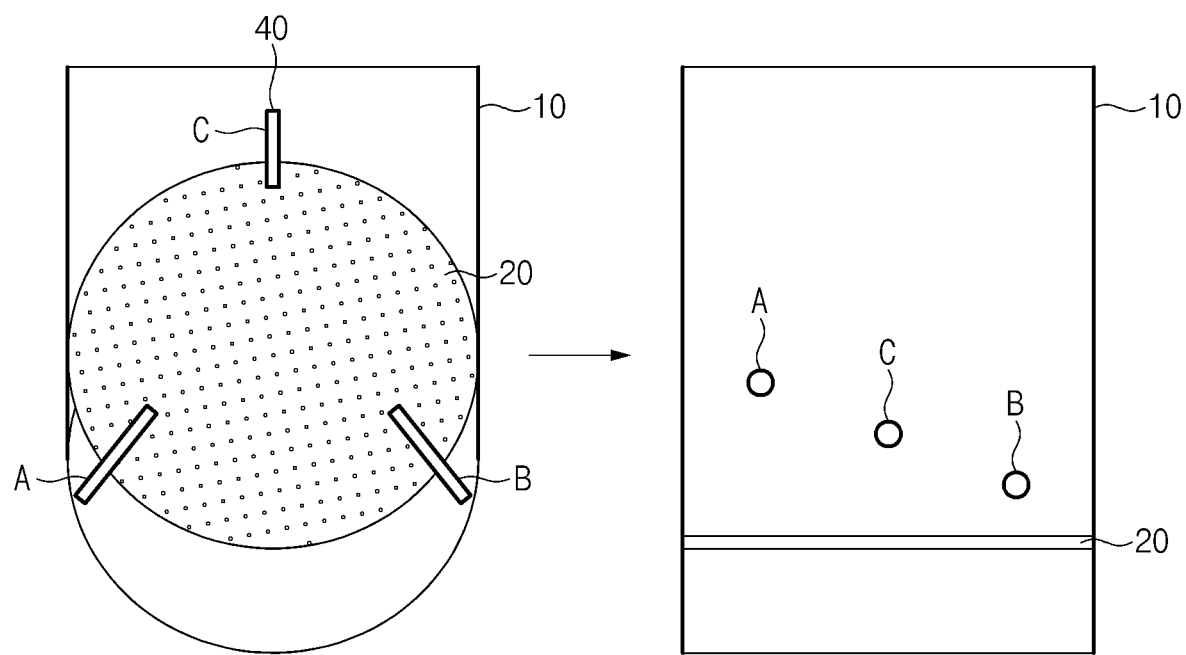
FIG. 4B is a view illustrating a state (left: a perspective view from an upper side to a lower side, and right: a front view from the outside) in which thermometers are disposed at three points of the reactor body at heights different from each other according to Embodiment 2 of the present invention.
Figure 4C:
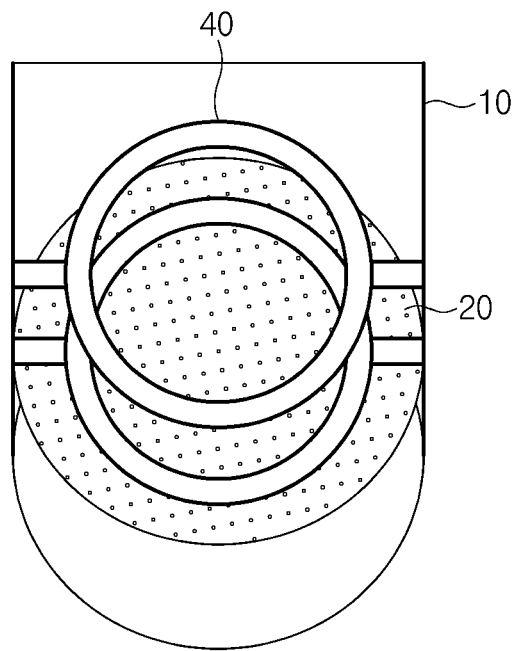
FIG. 4C is a perspective view of a state in which thermometers, each of which has a ring shape, are mounted inside the reactor body at heights different from each other according to Embodiment 3 of the present invention.

Referring to FIG. 4A, which illustrates a state in which the thermometers are disposed at four positions having the same height in the reactor body 10 according to Embodiment 1 of the present invention (left: perspective view viewed downward from an upper side by seeing through the reactor body 10, and right: front view viewed from the outside) (for reference, FIGS. 4A to 4C illustrate only the thermometers without illustrating the nozzle unit so as to prevent lines from overlapping each other in the drawings), the thermometers 40 according to Embodiment 1 have the same shape and are disposed at the same height in the reactor body 10.

Here, the thermometer 40 has a rod-like shape and may be configured to measure temperatures at various points through one thermometer 40. For example, the temperature sensors, which independently measure temperatures at three points which are divided into a point that is relatively close to an inner circumferential surface of the reactor body 10, a point that is relatively far from the inner circumferential surface of the reactor body 10, and a point between the close point and the far point, are disposed respectively to individually measure the temperatures at the three points through one thermometer 40. Thus, if four thermometers 40 are mounted as illustrated in FIG. 4A, temperatures may be individually measured at the twelve points. Of course, if more temperature sensors are attached to each thermometer 40, more detailed temperature measurements are possible at more points.

Also, referring to FIG. 4B, which illustrates a state in which three thermometers 40 are disposed at different heights in the reactor body according to Embodiment 2 of the present invention (left: perspective view viewed downward from an upper side, and right: front view from the outside), the thermometers according to Embodiment 2 have the same shape and are disposed at different heights in the reactor body 10.

In this embodiment, the thermometer 40 has a rod-like shape and may be configured to measure temperatures at various points through one thermometer 40. Also, the thermometers may be disposed at different heights to measure heights (amounts) of deposits. That is, if a temperature measured by the thermometer disposed at a point A, which is disposed at a relatively high position, is normal, and temperatures measured by the thermometers disposed at points C and B are abnormal, heights of the deposits may be estimated according to a degree of abnormality.

Referring to FIG. 4C, which illustrates a state in which ring-shaped thermometers 40 are mounted at different heights in the reactor body 10 according to Embodiment 3 of the present invention, in the ring-shaped thermometer 40, a plurality of temperature sensors may be radially disposed to more effectively sense accumulated positions and heights of deposits. However, a size and shape of the carbon nanotubes may be limited because there is a possibility of interference in flow of a catalyst metal and a reaction gas when the carbon nanotubes are synthesized.

In the fluidized bed reactor according to the present invention having the technical features as described above, the deposits within the reactor body 10 may be sensed through the sensing unit and be efficiently crushed through the nozzle unit 30 to more improve the production efficiency of the carbon nanotubes.

Since the plurality of nozzle units 30 are spaced apart from each other along the circumference of the dispersion plate 20, the shading section to which the inert gas is not reached may be minimized or suppressed to more efficiently crush the deposits.

Also, the nozzle unit 30 may be provided with two or more injection parts 33 in each of the housings 31 to inject the inert gas in move various directions.

Furthermore, the plurality of thermometers 40 constituting the sensing unit may be may be mounted to efficiently sense the generation state of the deposits according to the temperature difference at each point.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A fluidized bed reactor for manufacturing carbon nanotubes, comprising:
    a longitudinally-extending reactor body;
    a dispersion plate mounted within the reactor body to partition the inside of the reactor body in a traverse direction and having a plurality holes through which a reaction gas passes;
    a nozzle unit mounted on one surface of the dispersion plate to receive an inert gas from outside the reactor body and inject the inert gas so as to crush deposits on the dispersion plate;
    a sensing unit configured to sense the deposits on the dispersion plate; and
    a control unit configured to control operation of the nozzle unit according to information sensed by the sensing unit.

2. The fluidized bed reactor of claim 1, comprising a plurality of nozzle units spaced apart from each other along a circumference of the dispersion plate.

3. The fluidized bed reactor of claim 2, wherein the nozzle units each comprise:
    a housing fixed to one surface of the dispersion plate on which the deposits are accumulated;
    a supply line configured to supply the inert gas from the outside into the housing; and
    an injection part provided in the housing to inject the inert gas.

4. The fluidized bed reactor of claim 3, wherein two or more injection parts are provided in the housing to inject the inert gas in different directions.

5. The fluidized bed reactor of claim 4, wherein at least one of the injection parts provided in the housing is disposed to inject the inert gas toward the housing.

6. The fluidized bed reactor of claim 1, wherein the sensing unit comprises a thermometer disposed a predetermined distance from the one surface of the dispersion plate, on which the deposits are accumulated, and
    the control unit that estimates an accumulated amount of deposits according to a temperature change.

7. The fluidized bed reactor of claim 6, comprising a plurality of thermometers spaced apart from each other along the circumference of the dispersion plate.

8. The fluidized bed reactor of claim 6, wherein a plurality of thermometers are provided, which are disposed at different distances from the dispersion plate.

9. The fluidized bed reactor of claim 6, wherein the thermometer is a contact type thermometer configured to measure a temperature by directly contacting the deposits.

10. The fluidized bed reactor of claim 6, wherein the thermometer is a non-contact type thermometer that is disposed at a position that does not contact the deposits to measure a temperature by sensing light energy emitted from the deposits.

* * * * *